United States Patent [19]
Maxted et al.

[11] B 3,983,988
[45] Oct. 5, 1976

[54] CONVEYOR DIVERTER

[75] Inventors: Wesley R. Maxted, Grand Rapids; Bernard H. Woltjer, Jenison, both of Mich.

[73] Assignee: Rapistan, Incorporated, Grand Rapids, Mich.

[22] Filed: Aug. 7, 1974

[21] Appl. No.: 495,402

[44] Published under the second Trial Voluntary Protest Program on February 17, 1976 as document No. B 495,402.

[52] U.S. Cl. .............................. 198/365; 193/36; 198/436; 198/782; 198/367; 198/127 R
[51] Int. Cl.² ........................................ B65G 43/08
[58] Field of Search ............. 198/20 R, 21, 25, 38, 198/127 R, 185, 31 AA; 193/36

[56] References Cited
UNITED STATES PATENTS

| | | | |
|---|---|---|---|
| 2,613,790 | 10/1952 | Schottelkotte | 193/36 |
| 2,985,274 | 5/1961 | Byrnes et al. | 198/20 R |
| 2,988,196 | 6/1961 | Byrnes et al. | 198/20 R |
| 3,018,873 | 1/1962 | Burt | 198/38 |
| 3,058,565 | 10/1962 | Byrnes | 198/20 R |
| 3,058,567 | 10/1962 | Byrnes et al. | 198/20 R |
| 3,138,238 | 6/1964 | De Good et al. | 198/127 R |
| 3,254,752 | 6/1966 | Bauch et al. | 193/36 |
| 3,279,583 | 10/1966 | Abegglen | 198/38 |
| 3,370,685 | 2/1968 | Guilie | 193/36 |
| 3,650,375 | 3/1972 | Fleischauer et al. | 198/127 R |

*Primary Examiner*—Evon C. Blunk
*Assistant Examiner*—Jeffrey V. Nase
*Attorney, Agent, or Firm*—Price, Heneveld, Huizenga & Cooper

[57] ABSTRACT

A diverter for use in high speed transferring of selected articles moving along a conveyor onto an intersecting conveyor includes first and second rows of independently driven powered wheels and selectively movable mounting means for the two rows such that they can be moved between a first position where no diverting takes place and a second operative position in which the wheels of the first or upstream row are skewed at a first angle and positioned at a first vertical position above the conveyor surface and the wheels of the second row are skewed at a greater angle and are above the first row.

16 Claims, 7 Drawing Figures

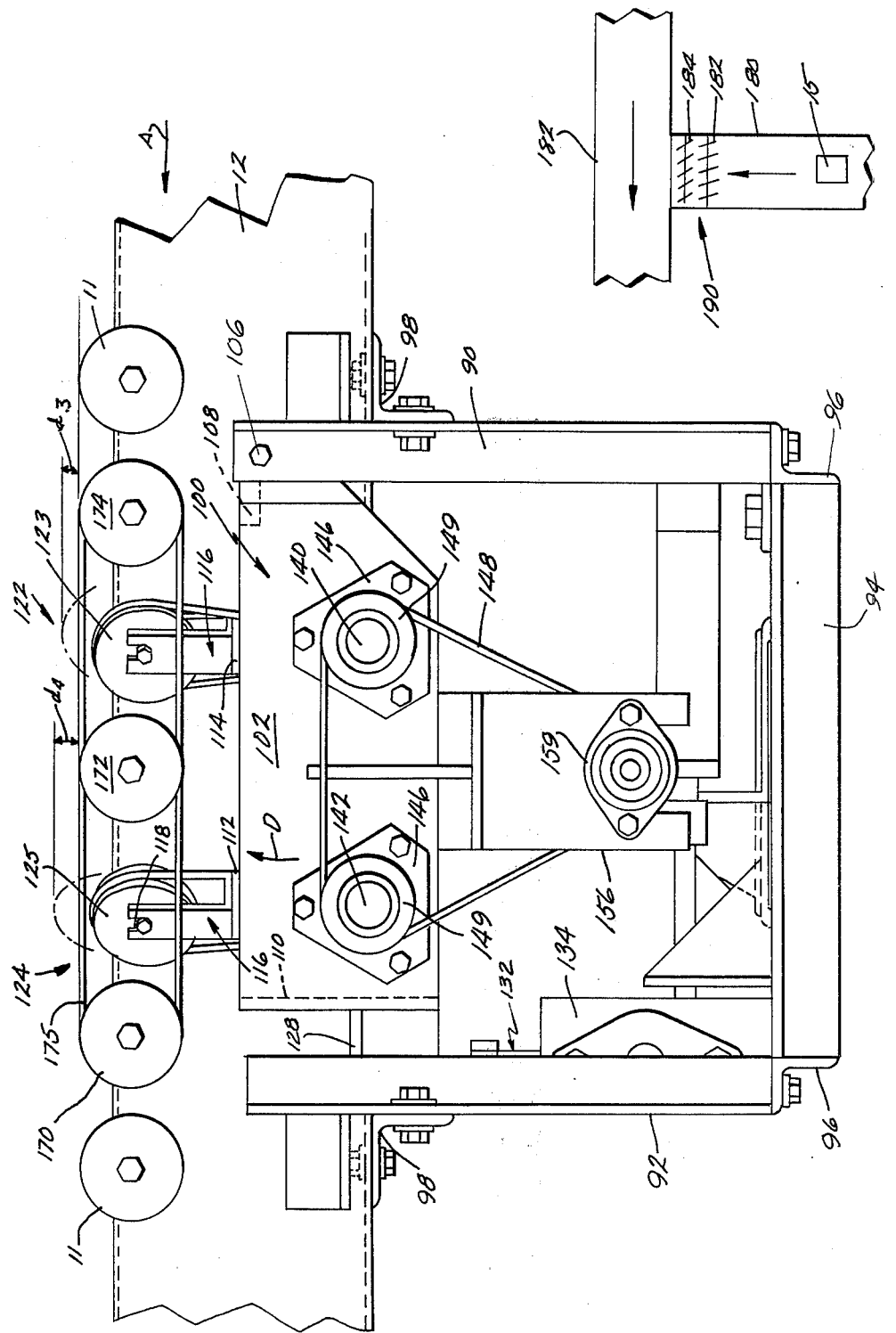

CONVEYOR DIVERTER

BACKGROUND OF THE INVENTION

The present invention relates to conveyors and more particularly to diverter mechanisms for selectively diverting articles traveling on one conveyor onto an intersecting conveyor.

A variety of diverting mechanisms for transferring articles from one conveyor onto an intersecting conveyor is known in the art. For example, U.S. Pat. No. 3,138,238 issued on June 23, 1964 to M. J. DeGood et al. and assigned to the present assignee is typical. In this system, a single row of power driven wheels is movable between inoperative and operative positions to engage an article traveling along the main conveyor and diverted onto a stub conveyor at an acute angle. In this prior art, a single row of wheels is provided for the diverting function and is powered by and driven at the same speed as the main conveyor. Other well known diverting mechanisms include several rows of similarly skewed wheels also driven at the same speed as the main conveyor.

Such diverting mechanisms apparently operate satisfactorily for average speed conveyors (i.e., 80 to 100 feet per minute) where the angle of diverting is an acute angle. In high speed applications where the conveyor may be operating as high as 500 feet per minute or more and/or where the articles are diverted at right angles to the main conveyor, the operation of such prior art systems has not proven successful. The failure to provide the desired diverting under such circumstances is in part due to the fact that the diverting wheels are driven at the same speed as the main conveyor as well as the inability of such systems to rapidly and significantly change the direction of motion of the articles within the divert area.

SUMMARY OF THE INVENTION

The diverting mechanism of the present invention, however, overcomes the deficiencies of the prior art by providing at least a pair of power driven members spaced along the main conveyor and driven at speeds significantly greater than the main conveyor speed. In addition, the diverting mechanism is skewed relative to the longitudinal axis of the main conveyor at increasing angles along the flow of an article along the main conveyor and is progressively elevated from the bed of the main conveyor to gradually raise, rotate and accelerate articles as they are rapidly moved from the direction of travel of the main conveyor onto an intersecting conveyor.

This structure, in its preferred embodiment, includes first and second rows of wheels mounted to the main conveyor at the point of diverting and which are selectively movable between a first position whereupon they do not effect the direction of movement of articles traveling along the main conveyor and a second position where the articles engage the diverting wheels to transfer the article from the main conveyor to the intersecting conveyor.

The structure of the invention together with its operation and its unique features can best be understood by referring to the following description thereof together with the accompanying drawings in which:

BRIEF DESCRIPTION OF THE DRAWINGS

FIG. 5 is an enlarged, fragmentary left side view of an alternative embodiment of the present invention;

FIG. 7 is a plan schematic view of a further embodiment of the present invention.

DETAILED DESCRIPTION OF THE PREFERRED EMBODIMENT

Figure 1:
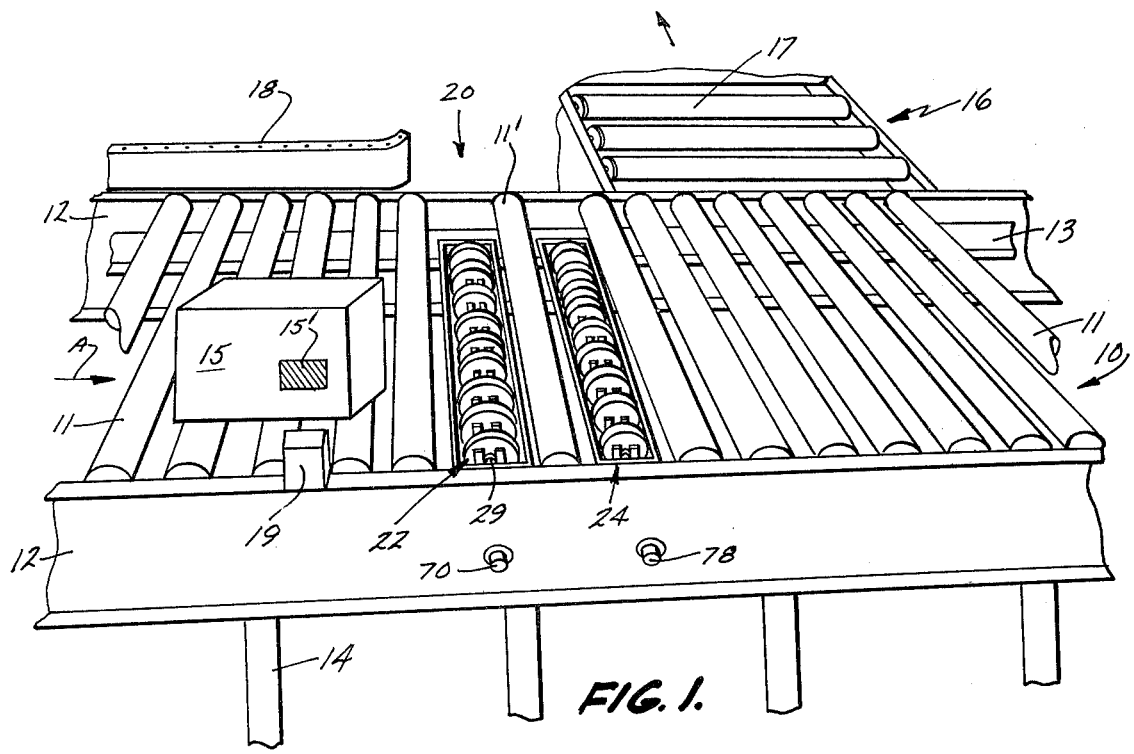
FIG. 1 is a fragmentary, perspective view of one embodiment of the present invention.

Referring now to FIG. 1, there is shown a main conveyor 10 including a plurality of powered rollers 11 spaced between channels 12 and driven by a drive belt 13 for transporting articles such as cartons 15 therealong in a direction along the longitudinal axis of the conveyor as indicated by arrow A in FIG. 1. The channels are supported by conventional framework structure 14 to support the conveyor above the floor of an installation. An intersecting conveyor 16 intersects the main conveyor 10 at right angles and includes a plurality of similarly powered rollers 17.

Positioned at a divert location slightly upstream the main conveyor from the intersecting conveyor 16 is one embodiment of the novel divert mechanism 20 shown in its nondiverting position in FIG. 1. A conventional bumper guard 18 is positioned along the edge of conveyor 10 upstream and adjacent the diverter 20. Diverter 20 is selectively actuated by code means such as a retroreflective detector and control unit 19 positioned on the edge of conveyor 10, as shown in FIG. 1, for detecting a code or retroreflective strip 15' positioned on article 15 which is to be diverted. Thus, only those cartons desired to be transferred from the main conveyor 10 onto the intersecting conveyor 16 will carry the code strip and actuate divert mechanism 20.

Figure 4:
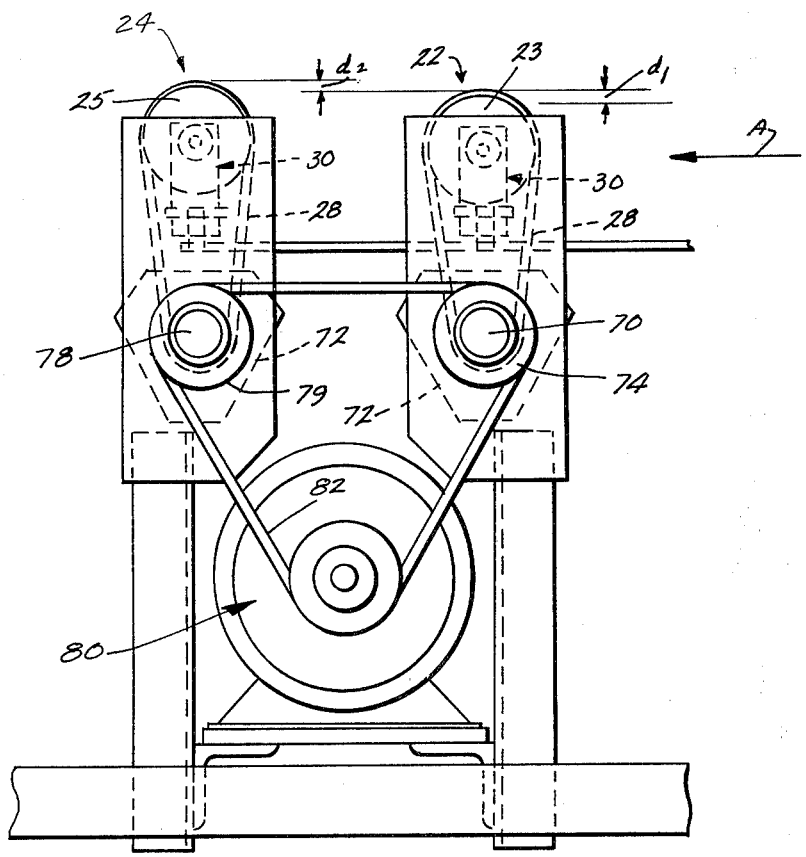
FIG. 4 is a right end view of the structure shown in FIG. 3.
Figure 2:
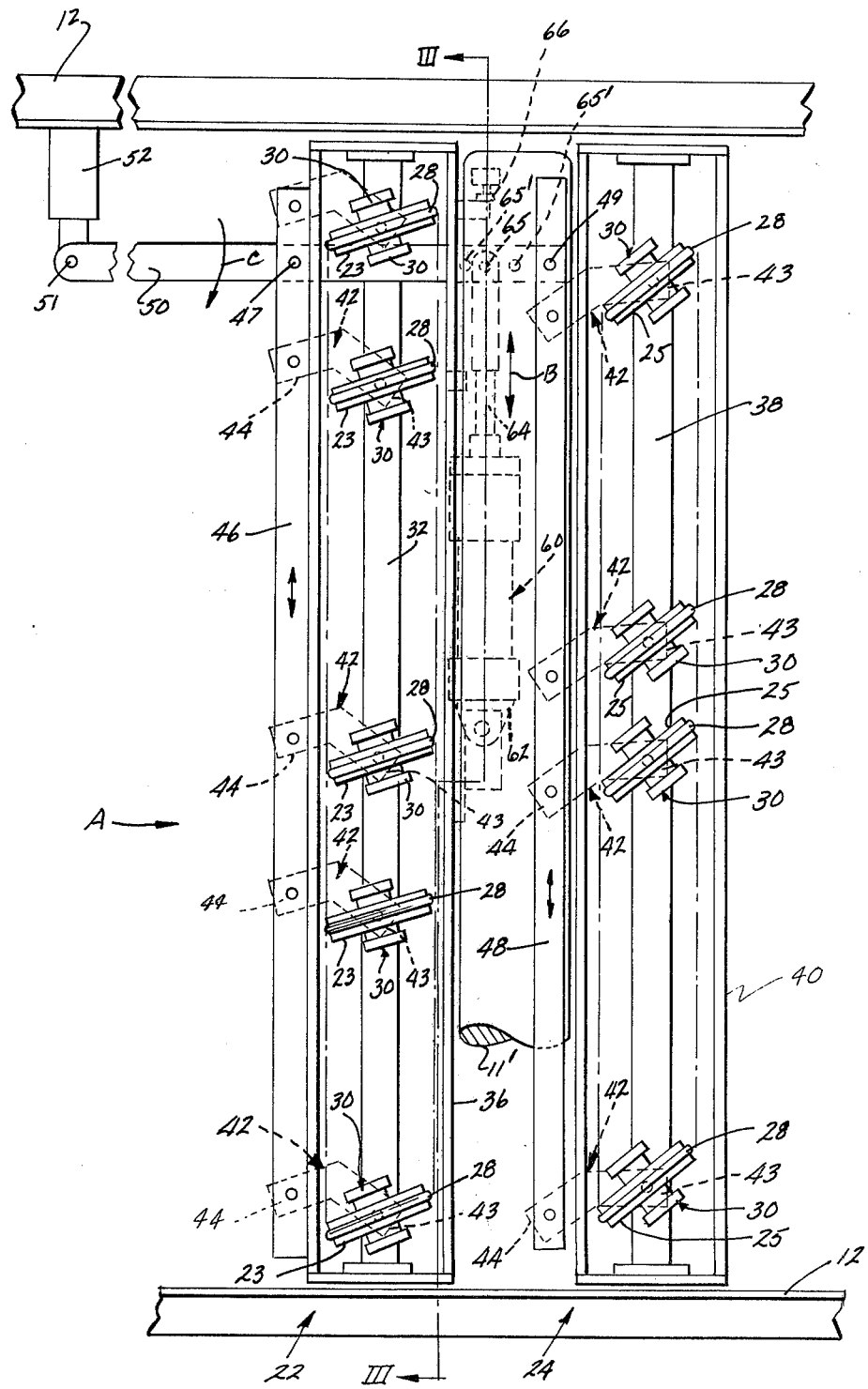
FIG. 2 is an enlarged, fragmentary plan view of the diverter shown in FIG. 1.
Figure 3:
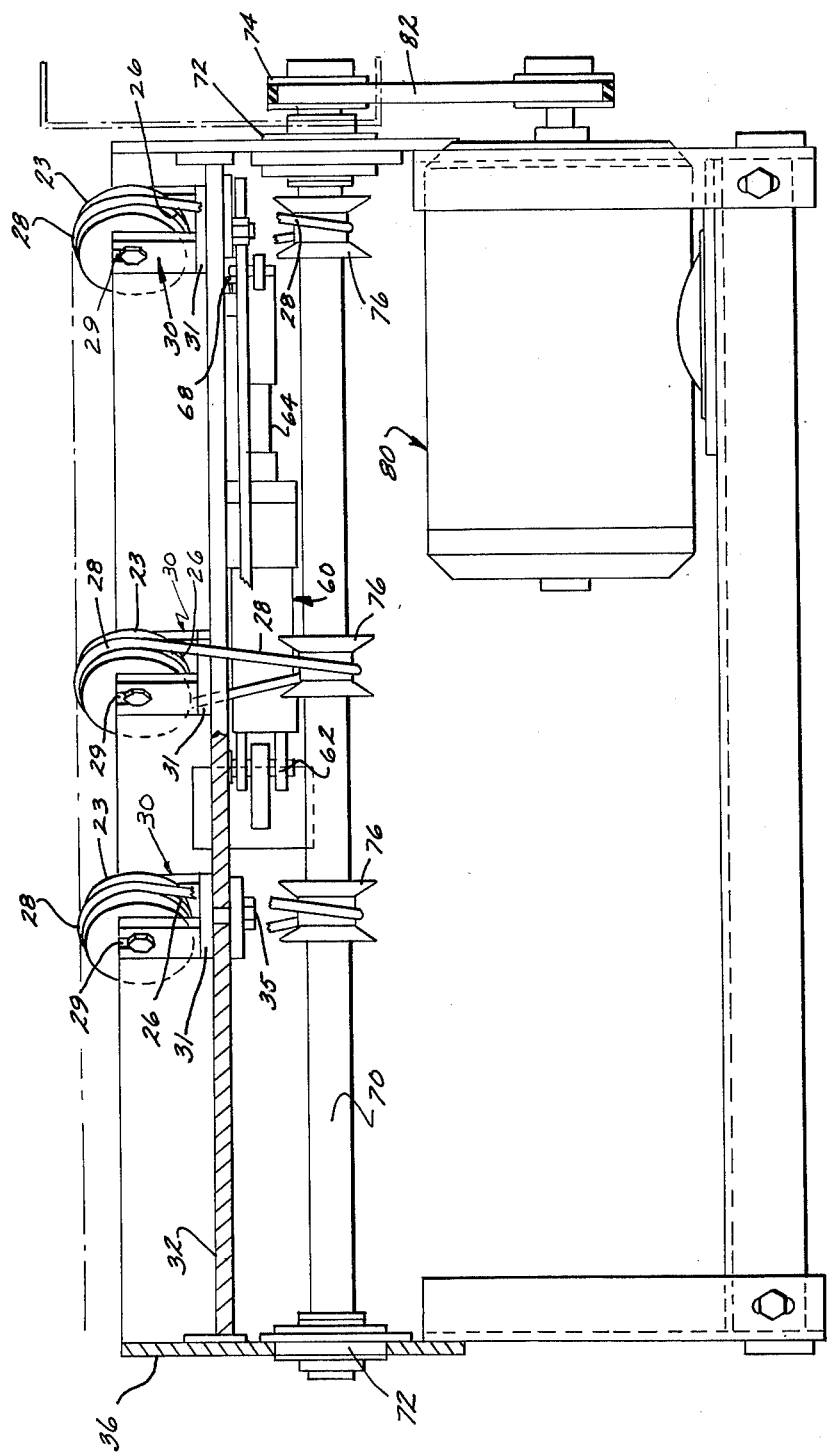
FIG. 3 is an enlarged, fragmentary front elevational view, partly in cross section, taken along the section lines III—III of FIG. 2.

In the embodiment shown in FIGS. 1–4, the divert mechanism 20 comprises a first or upstream article conveying means comprising a row 22 of spaced power driven wheels 23 and a second or downstream article conveying means comprising a row 24 of spaced power driven wheels 25. An intermediate roller 11' is positioned between rows 22 and 24, as seen in FIG. 1, and is part of the main conveyor. In their nondiverting position, wheels 23 and 25 are aligned along the longitudinal axis of the main conveyor 10, as seen in FIG. 1, such that as an article 15 passes thereover, the carton continues along the main conveyor. When, however, the diverter mechanism is actuated, the wheels 23 and 25 are skewed, as best seen in FIG. 2, to progressively raise the carton from the main conveyor, rotate it, and accelerate it onto the intersecting conveyor 16. Referring now to FIGS. 2–4, a detailed description of the construction of this embodiment is presented.

Each of the wheels 23 and 25 includes a groove 26 extending around the periphery and centrally located to receive a drive belt 28. Each of the wheels is rotatably mounted within a pair of slots 29 formed in the legs of a U-shaped bracket 30. Slots 29 permit the vertical adjustment of the wheels in brackets 30. Each brackt 30 includes a base segment 31 pivotally mounted to an associated fixed bar. In the first or upstream row 22, fixed bar 32 extends across a rectangular frame member 36. In the second or downstream row 24, U-shaped brackets 30 are pivotally attached to fixed bar 38 extending between a rectangular frame member 40. A bolt 35 (FIG. 3) is employed to provide the pivotal connection between the brackets and bars. A plurality of arms 42 (FIG. 2) each have one end 43 fixedly secured to the base 31 of U-shaped bracket 30 and an opposite end 44 pivotally coupled to a sliding bar. In the upstream row 22, the sliding bar is referenced as bar 46. The bar associated with the downstream row of wheels is bar 48. Sliding bars 46 and 48 are pivotally coupled at one end to a pivot arm 50 at pivot connections 47 and 49 (FIG. 2) respectively. Pivot arm 50 has its end remote from connection 49 pivotally coupled to a bracket 52 by means of pivot connection 51. Bracket 52 in turn is coupled to member 12 forming a portion of the stationary conveyor frame.

Pivot arm 50 is actuated to pivot about point 51 and, therefore, move the sliding arms 46 and 48 laterally by means of a pneumatic cylinder 60 having one end 62 pivotally coupled to the side of frame 36 as shown in FIG. 2. The free end of cylinder rod 64 is pivotally coupled to arm 50 at pivot connection 65. The distance from pivot connection 65 to pivot connection 49 is significantly less than the distance from pivot connection 65 to pivot connection 47 thereby providing, given incremental movement of rod 64, a greater skewing angle for the second or downstream row 24 of wheels than the upstream row 22 of wheels as seen in FIG. 2. Rods 64, 46 and 48 move laterally as indicated by arrows B in FIG. 2.

A first adjustable stop 66 (FIG. 2) is mounted to frame member 12 to limit the excursion of rod 64 to assure that when it is fully extended from cylinder 60, each of the wheels 23 and 25 is longitudinally aligned with the axis of the main conveyor 10 as seen in FIG. 1. When rod 64 is actuated by the retroreflector control unit 19 through a conventionally actuated pneumatic valve, pivot arm 50 moves in a direction indicated by arrow C in FIG. 2. Slide arms 46 and 48 move downwardly in the drawing of FIG. 2 to pivot the upstream row of wheels at an angle of approximately 24° and the downstream row of wheels at an angle of approximately 37° as best seen in FIG. 2. These angles were found to optimize operation of the preferred embodiment where the main conveyor speed was approximately 350 feet per minute and the divert wheels are driven to convey an article at the significantly greater speed of 450 feet per minute.

A second adjustable stop 68 is mounted to the floor of frame 36, as best seen in FIG. 3, to limit the retraction of rod 64 to provide a limit to the skewing angle of the wheels. By adjusting the pivot connection 65 of shaft 64 to arm 50, the relative distance between this pivot and the interconnection of the sliding bars 46 and 48 can be adjusted to change the relative skew angles between the first and second rows of wheels. To provide such adjustment, a plurality of spaced apertures 65' are provided in arm 50 (FIG. 2).

The powered drive for wheels 23 and 25 is best seen in FIGS. 3 and 4 whereby a first drive shaft 70 extends between the ends of the downwardly depending legs of frame member 36 and is rotatably mounted thereto by means of bearing assemblies 72. Shaft 70 is driven by a drive motor 80 having a drive belt 82 extending around a drive pulley 74 at the extending end of shaft 70. A plurality of pulleys 76 are spaced along shaft 70 and each of the drive belts 28 extends around the grooves 26 in the wheels and around the pulleys 76 to couple the two and transfer the rotational movement of shaft 70 to the wheels. Belts 28 permit the skewing of the wheels while maintaining continuous mechanical interconnection and rotation thereof with shaft 70 as well as providing a frictional engaging contact with an article traversing the diverter mechanism.

Shaft 78 is associated with the second row 24 of wheels and similarly includes a plurality of pulleys spaced therealong for coupling the drive belts 28 between the wheels and the drive pulleys. Drive belt 82 surrounds the drive pulley 79 mounted to the extension of shaft 78 as seen in FIG. 4.

As best seen in FIG. 4, wheels 23 are mounted a first distance $d_1$ (approximately one-eighth inch) above the contact surface of the rollers 11 of the main conveyor while wheels 25 are mounted within brackets 30 a distance $d_2$ (approximately one-eighth inch) higher than wheels 23. By so mounting the wheels, the carton traversing the diverter is progressively elevated from the conveyor as it is rotated and accelerated. This vertical acceleration increases the frictional contact between the article and the diverter wheels. Motor 80 is driven such that the speed of wheels 23 and 25 drives articles traversing the wheels at a lineal speed of approximately 450 feet per minute. When combined with the progressively elevated wheels and the progressively increasing skew angle of the wheels when the diverting mechanism is in its operative position, as shown in FIGS. 2–4, the carton is progressively elevated, rotated, and accelerated from the main conveyor 10 onto the intersecting conveyor 16. The control unit 19 is a commercially available unit.

Thus, it is seen that in the first embodiment, the diverting means is shifted between operative and inoperative diverting positions by maintaining the vertical orientation the same and shifting the wheels between an aligned position when diverting is not called for and a skewed position when diverting is required. The actuation of the cylinder 62 is rapid to permit selective diverting of alternate articles in the most severe sorting functions. The system has complete flexibility as to the absolute skewing of each row of wheels, the relative skew angles between the rows of wheels, the relative heights of the wheels, and, by virtue of the variable speed motor 80, the drive speed of the diverter. As such, this system can accommodate a variety of installation requirements.

Figure 6:
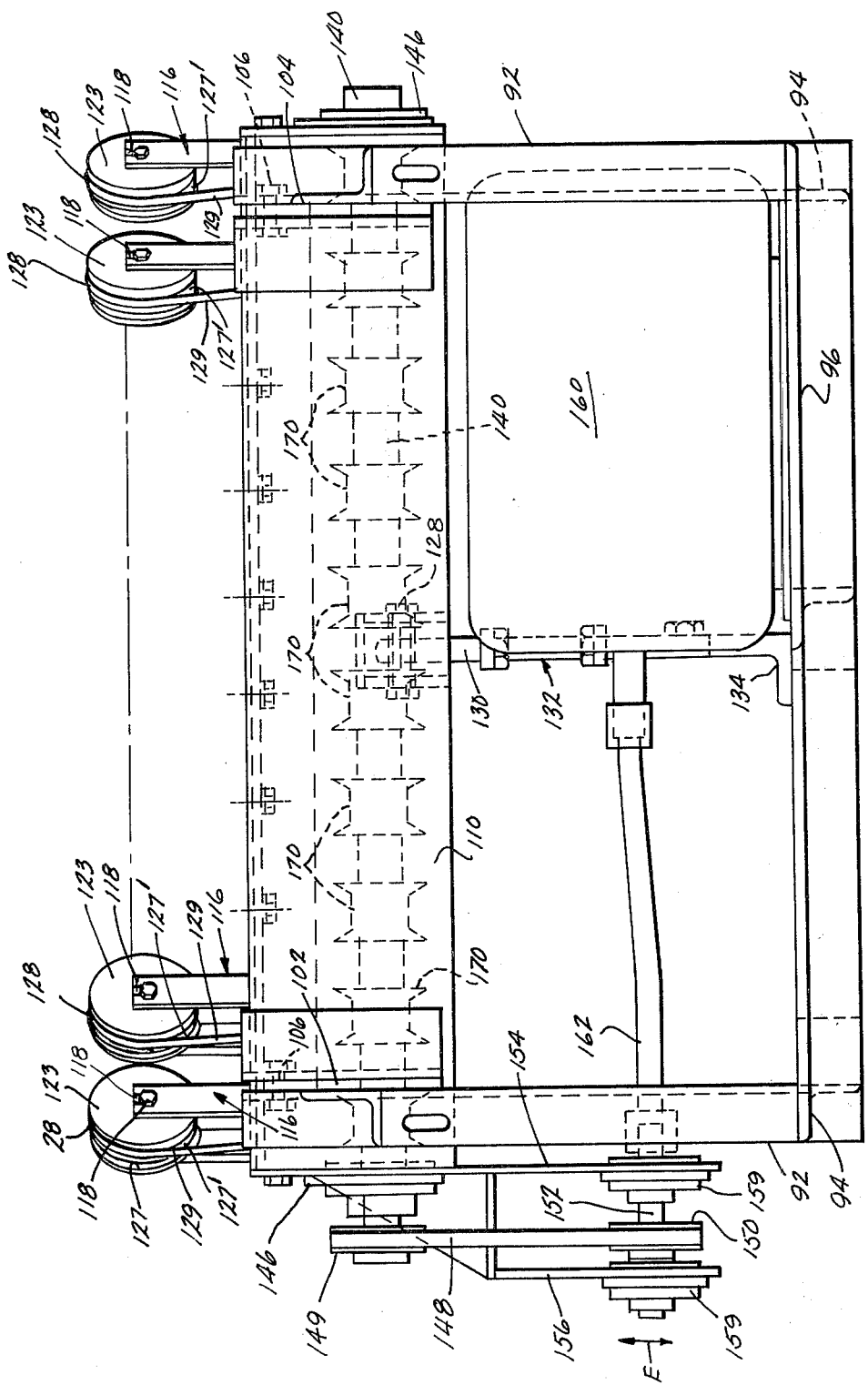
FIG. 6 is a fragmentary, front view of the structure shown in FIG. 5 as viewed from the right side of FIG. 5.

In the second embodiment of the invention, shown in detail in FIGS. 5 and 6, the height and skew angles of the first and second rows of power driven diverter wheels are adjustable but fixed at selected levels and relative angles and the unit is raised and lowered to provide diverting and nondiverting functions respectively. A detailed description of this embodiment is now presented.

The diverter unit shown in FIGS. 5 and 6 comprises a fixed, U-shaped frame comprising vertical members 90 and 92 on each side of the frame interconnected by base members 94 and cross members 96 bolted together as shown in the drawings. The frame so defind is rigidly bolted to the main conveyor frame by means of angle brackets 98 as best seen in FIG. 5. Pivotally mounted within the fixed framework is a movable frame 100 including first and second end plates 102 and 104 pivotally mounted to vertical members 90 by means of pivot connections 106. Extending between plates 102 and 104 at the pivot end is a cross support 108 (FIG. 5) and along the opposite edge, a second vertically extending cross plate 110. Extending across the top edges of the plates 102 and 104 is a pair of wheel mounting plates 112 and 114 permitting a plurality of U-shaped wheel brackets 116 mounted at spaced intervals along the width of the diverter mechanism as best seen in FIG. 6.

Brackets 116 include elongated notches 118 extending downwardly from the upper edge of the vertical leg segments to permit wheels 123 and 125 to be individually adjusted at preselected vertical heights. The bases of the U-shaped brackets 116 are bolted to the respective cross members 112 and 116 at selected skewing angles for the first and second rows 122 and 124 of wheels 123 and 125 respectively. As in the first embodiment, the wheels 123 associated with the first row 122 are adjusted to be approximately 1/8 inch above the wheels 11 of the main conveyor 10, indicated by distance $d_3$ in FIG. 5, while wheels 125 associated with the second row 124 are adjusted to be approximately a distance $d_4$ of approximately one-fourth inch above the upper portion of the main conveyor wheels 11 when the movable frame 100 is pivoted about points 106 from a lowered or inoperative position, as seen in FIG. 5, to a raised position shown in phantom form in FIG. 5. This is accomplished by the following structure.

Extending outwardly from the cross plate 110 of frame 100 is a tongue 128 to which is coupled the movable rod 130 of a pneumatically operated cylinder 132. The opposite end of cylinder 132 is pivotally mounted to a bracket 134 extending upwardly from the cross members 96 (FIG. 6). As cylinder 132 is actuated by the code or retroreflective control unit 19, as in the first embodiment, rod 130 extends from the cylinder body to pivot frame 100 upwardly in a direction indicated by arrow D in FIG. 5 such that the first and second rows of wheels 122 and 124, respectively, are in the elevated operative position.

As best seen in FIG. 6, the wheels include a first peripheral groove 127 in which an O-ring 128 is mounted and a second groove 127' around which a drive belt 129 extends. To drive the wheels, a pair of drive shafts 140 and 142 extend between the end plates 102 and 104 of the movable frame 100 and are rotatably mounted thereto by suitable bearing assemblies 146. The shafts extend outwardly from the end plate 102 and are coupled to a drive belt 148 by means of pulleys 149. Drive belt 148 extends around a drive pulley 150 mounted on a drive shaft 152 extending between an end plate 154 (FIG. 6) and an outer support plate 156, both of which are attached to the movable frame 100 by means of spacer block 158 as seen in FIG. 6. Bearing assemblies 159 support shaft 152 which is coupled to a drive motor 160 mounted to the fixed framework and coupled to shaft 152 by means of a flexible coupling 162. Coupling 162 permits the vertical motion of the drive shaft 152, as indicated by arrow E in FIG. 6, while continuously coupling the shaft to the fixed drive motor 160. A plurality of drive pulleys 170 is positioned in spaced relationship along shafts 140 and 142 and drive belts 129 surround the wheels 123 and 125 and associated pulleys 170 to provide rotational drive for the rollers.

In order to provide continuous support for articles passing through the diverting unit shown in FIGS. 5 and 6, the main conveyor is provided with three wheels 170, 172 and 174, as seen in FIG. 5, which are longitudinally spaced such that wheel 172 is centrally positioned between the first and second row of diverter wheels 122 and 124 and wheels 170 and 174 are spaced outwardly on opposite sides thereof. Each of these wheels is provided with a plurality of spaced grooves for receiving a plurality of continuous belts 175 which are interfitted between the spaced skewed wheels 123 and 125. Wheels 170, 172 and 174 are powered by the main conveyor. Thus, when the movable frame 100 is lowered to its inoperative position shown in FIG. 5, continuous support is provided for the cartons by structure which does not interfere with the raising and lowering of the diverter wheels.

In this embodiment, therefore, the diverting mechanism is moved between operative and inoperative positions by elevating the fixed but adjustably skewed first and second rows of wheels. Motor 160, as in the first embodiment, drives wheels 123 and 125 to convey articles on the diverter significantly faster than the main conveyor.

Referring now to a third embodiment shown schematically in FIG. 7, the unique diverter mechanism is employed for a merging function where articles 15 are merged from a stub conveyor 180 onto a second conveyor 182 by diverter 190. In this embodiment, first and second rows 182 and 184 of power driven wheels are provided. The structure of the diverting station 190 including rows of wheels can be identical to either of the first and second embodiments previously described. Since, however, all articles are merged by diverting them from conveyor 180 onto conveyor 182, there is no requirement for selective movement of the diverter between operative and inoperative positions. Accordingly, the pivot mechanism for the selective pivoting of the diverter wheels of the first embodiment is eliminated and the wheels permanently skewed at the progressively raised and increased skewing angles as seen in FIGS. 2 and 3. If the structure of the second embodiment is employed, the movable framework is secured to the fixed frame or made as an integral part thereof. In both embodiments, the actuation cylinders are eliminated.

In the embodiment in FIG. 7, the wheels are mounted in brackets identical to brackets 30 and 116 previously discussed such that the wheels can be selectively adjusted to the desired skew angles and the relative height of the wheels can also be adjusted. Additionally, the drive motor provides independent drive for the diverter wheels at speeds significantly greater than the speed of conveyor 180 such that the articles are progressively raised, rotated and accelerated from the stub conveyor onto the merging conveyor 182.

It will become apparent to those skilled in the art that various modifications to the preferred embodiments of the invention disclosed herein can be made. The system is adaptable for left- or right-hand diverting or, in the case of the first embodiment, both. These and other modifications to the present invention, however, will fall within the spirit and scope of the invention as defined by the appended claims.

The embodiments of the invention in which an exclusive property or privilege is claimed are defined as follows:

1. A diverter for selectively diverting articles from one conveyor to an intersecting conveyor comprising:
    first article conveying means positioned on said one conveyor upstream of the intersecting conveyor and skewed to transport articles at an angle relative to the direction of advancement of such articles on said one conveyor;
    second article conveying means positioned between said first article conveying means and the intersection of said one conveyor with said intersecting conveyor and skewed to transport articles at a greater angle relative to the direction of advancement of such articles on said one conveyor than said first article conveying means;
    drive means coupled to said first and second article conveying means for driving them at a speed to move articles in contact therewith at a speed greater than the conveying speed of said one conveyor; and
    selectively actuated means coupling said first and second article conveying means to said one conveyor for moving said first and second article conveying means between an operative position with said first article conveying means extending above said one conveyor a predetermined distance and said second article conveying means extending above said one conveyor a greater predetermined distance than said first article conveying means for progressively elevating and rotating articles onto said intersecting conveyor and an inoperative position where articles continue along said one conveyor.

2. The apparatus as defined in claim 1 wherein said first and second article conveying means comprise a first and second row of spaced power driven wheels respectively.

3. The apparatus as defined in claim 2 wherein said coupling means comprises means for aligning said first and second rows of wheels with the longitudinal axis of said one conveyor when in said inoperative position and skewing said first and second wheels with respect to the longitudinal axis of said one conveyor when in said operative position.

4. The apparatus as defined in claim 3 wherein said coupling means includes means for mounting said wheels of said first row to extend slightly above the upper surface of said one conveyor and for mounting said wheels of said second row to extend slightly above said wheels of said first row.

5. The apparatus as defined in claim 2 wherein said coupling means includes a fixed frame coupled to said one conveyor and a movable frame movably coupled to said fixed frame and means for raising and lowering said movable frame between operative and inoperative positions respectively and wherein wheels of said first and second rows of wheels are each mounted in a bracket fixedly but adjustably mounted to said fixed frame at a desired skew angle such that only when said movable frame is in a raised position said wheels engage an article to divert said article onto said intersecting conveyor.

6. The apparatus as defined in claim 5 wherein said first row of wheels is mounted to extend slightly above said one conveyor and said second row of wheels is mounted to extend slightly above said first row of wheels when said movable frame is raised to an operative position.

7. The apparatus as defined in claim 6 wherein said movable frame is pivotally mounted to said fixed frame at one end and a pneumatic cylinder is provided and is coupled between said fixed and movable frames at an opposite end and is actuatable to raise and lower said rows of wheels by pivoting said movable frame with respect to said fixed frame.

8. The apparatus as defined in claim 7 wherein said drive means comprises a motor coupled to said fixed frame and having an output shaft;
    drive shaft means coupled to said movable frame;
    flexible interconnecting means coupling said motor output shaft to said drive shaft means; and
    a plurality of drive belts each coupling one of said wheels to said drive shaft means.

9. The apparatus as defined in claim 8 wherein articles to be diverted include an indicia and said apparatus includes means positioned upstream of the intersection of said one conveyor and said intersecting conveyor and coupled to said cylinder for detecting said indicia and for actuating said cylinder to shift said first and second rows of wheels to a raised operative position only when an article to be diverted is detected.

10. A diverter for selectively diverting articles from one conveyor to an intersecting conveyor comprising:
    a first row of spaced power driven wheels positioned on said one conveyor upstream of the intersecting conveyor and skewed to transport articles at an angle relative to the direction of advancement of such articles on said one conveyor;
    a second row of spaced power driven wheels positioned between said first article conveying means and the intersection of said one conveyor with said intersecting conveyor and skewed to transport articles at a greater angle relative to the direction of advancement of such articles on said one conveyor;
    drive means coupled to said first and second rows of spaced power driven wheels for driving them at a speed to move articles in contact therewith at a speed greater than the conveying speed of said one conveyor; and
    selectively actuated means coupling said first and second rows of spaced power driven wheels to said one conveyor for moving said first and second rows of spaced power driven wheels between an operative position skewed with respect to the longitudinal axis of said one conveyor for diverting articles onto said intersecting conveyor and an inoperative position aligned with the longitudinal axis of said one conveyor where articles continue along said one conveyor wherein said coupling means includes means for mounting said wheels of said first row to extend slightly above the upper surface of said one conveyor and for mounting said wheels of said second row to extend slightly above said wheels of said first row and wherein each of said wheels is rotatably mounted in a bracket and said coupling means includes first and second fixed support bars to which said first and second rows of wheels are pivotally coupled respectively; first and second sliding bars associated with said first and second fixed support bars respectively; a plurality of coupling arms each having one end secured to one of said brackets and the opposite end coupled to one of said sliding bars for coupling each bracket to one of said sliding bars; a pivot arm having one end pivotally coupled to said one conveyor and wherein ends of said first and second sliding bars are pivotally coupled to said pivot arm spaced from said one end and from each other; and means coupled to said pivot arm for selectively moving said pivot arm to thereby rotate said brackets between wheel aligned and wheel skewed positions.

11. The appparatus as defined in claim 10 wherein articles to be diverted include an indicia and said apparatus includes means for detecting said indicia and coupled to said moving means for actuating said first and second rows of wheels to shift them to a skewed position only when an article to be diverted is detected.

12. For use in transferring articles from one conveyor onto an intersecting conveyor, diverter mechanism comprising:
 a first row of wheels positioned on said one conveyor upstream of the intersection of the conveyors and elevated above said one conveyor a predetermined distance and skewed with respect to the longitudinal axis of said one conveyor;
 at least a second row of wheels positioned on said one conveyor between said first row and said intersection and elevated above said one conveyor a greater predetermined distance than said first row and skewed a greater amount than said first row; and
 drive means for driving said first and second rows of wheels at a speed greater than the speed of said one conveyor whereby articles are progressively elevated, rotated and accelerated from said one conveyor onto said intersecting conveyor.

13. The apparatus as defined in claim 12 and further including coupling means for mounting said first and second rows of wheels to said one conveyor such that said rows of wheels can be moved between diverting and nondiverting positions.

14. The apparatus as defined in claim 13 wherein said coupling means includes means for moving each of said wheels between a skewed and an aligned position with respect to the longitudinal axis of said one conveyor.

15. The apparatus as defined in claim 13 wherein said coupling means includes means for raising said first and second rows of wheels to an article engaging position and lowering said first and second rows of wheels from said article engaging position.

16. The apparatus as defined in claim 13 wherein articles to be diverted include a code strip and said apparatus includes means for detecting said code strip and coupled to said coupling means for actuating said coupling means for moving said first and second rows of wheels to a diverting position only when an article to be diverted is detected.

* * * * *